Oct. 17, 1944.   J. L. ANDERSON   2,360,636
APPARATUS FOR WELDING AND SMOOTHING SEAMS
Original Filed July 10, 1937
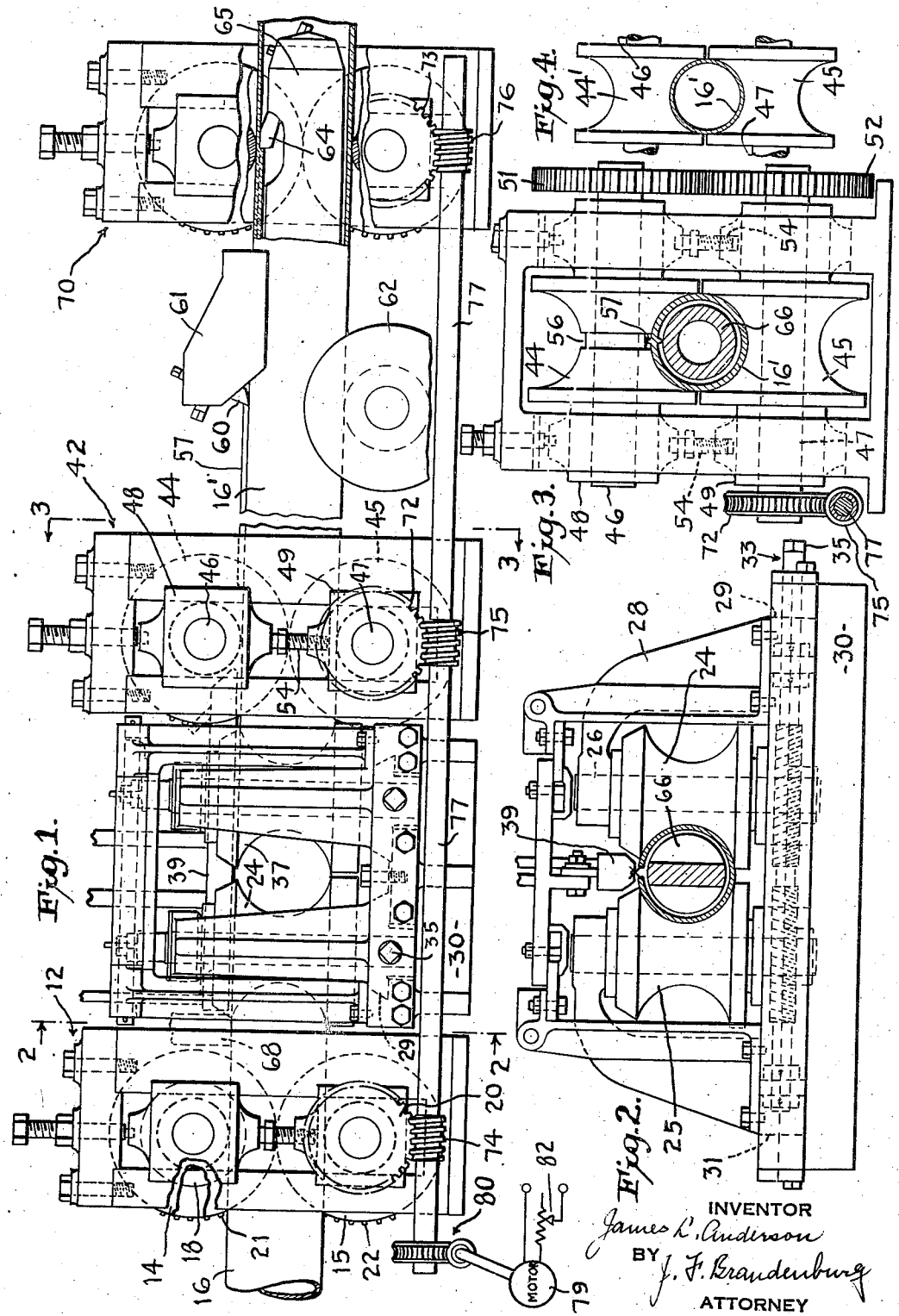
INVENTOR
James L. Anderson
BY
J. F. Brandenburg
ATTORNEY Patented Oct. 17, 1944

2,360,636

UNITED STATES PATENT OFFICE 2,360,636

APPARATUS FOR WELDING AND SMOOTHING SEAMS

James L. Anderson, Closter, N. J., assignor to Air Reduction Company, Incorporated, New York, N. Y., a corporation of New York Original application July 10, 1937, Serial No. 152,957. Divided and this application May 1, 1940, Serial No. 332,657

9 Claims. (Cl. 78—87)

This invention relates to apparatus for welding the longitudinal seams of tube blanks.

In the older types of tube welding machines a tube blank passes under a high-temperature heating agency which progressively melts away substantial portions of the opposing edge faces along the seam and the molten metal comes together in a puddle which solidifies to make the weld. With more modern tube welding methods the seam edges are heated by projecting flame jets directly against the edge faces in a manner that produces a substantially uniform heating and only superficial melting over the surfaces of the edge faces without allowing time for heat to be distributed by conduction through the metal. Such direct heating makes possible much higher speeds of welding and reduces the heating cost because less fuel is used.

It is an object of this invention to provide improved apparatus for welding tubes with direct flame heating of the edge faces of the seam. When operating at the very high speeds made possible by direct flame heating, the seamwise extent of the heating system is considerable and an accurate control of the positions of the edge faces must be exercised for a substantial distance along their length. One feature of the invention relates to the control of the positions of the seam edge faces while the tube blank is advanced by power driven rolls.

Another difference between the old puddle weld methods in which substantial quantities of metal are melted and sufficient time allowed for a distribution of heat by conduction through the metal, and the direct edge heating with a surface fusion or mere softening of the edge faces, is that the heat which soaks back into the body of the tube with puddle welding causes slow cooling of the weld, but the steep temperature gradient in the metal when welding at high speed with direct flame heating causes a rapid cooling of the weld metal.

With certain grades of steel the slow cooling makes the metal of the weld softer than the body of the tube, whereas the rapid cooling of the direct flame heating methods makes the weld harder than the remainder of the tube.

In my copending application, Serial No. 152,-957, (Patent No. 2,249,592, dated July 15, 1941), filed July 10, 1937, of which this case is a division, there is disclosed an improved method of welding without producing any substantial change either way in the hardness of the metal from which the weld is made. It is an object of this invention to provide simple and efficient apparatus by which the method disclosed in said Patent No. 2,249,592 can be carried out.

Other objects, features and advantages of the invention will appear or be pointed out as the specification proceeds.

In the accompanying drawing, forming a part hereof:

Fig. 1 is a side elevation, partly diagrammatic and partly broken away, of tube welding apparatus embodying the invention.

Figs. 2 and 3 are sectional views on the lines 2—2 and 3—3, respectively, of Fig. 1.

Fig. 4 is a reduced fragmentary detail view showing alternative roll structure for the welding roll stand of Fig. 3.

A tube blank which may come direct from a forming mill, and which may be either cold or preheated, enters a roll stand 12 having feed rolls 14 and 15. The tube blank is indicated by the reference character 16 and the welded tube by the reference character 16'.

The upper feed roll 14 has a central fin 18 which extends into the seam and acts as a seam guide in a manner well understood in the art. The lower feed roll 15 is driven by a worm wheel 20 secured to the axle of the roll 15, and the upper feed roll 14 is driven through meshing gears 21 and 22 fastened to the upper and lower roll axles. These driving connections to the rolls are similar to those of the welding roll stand and will be described somewhat more fully in the explanation of the welding roll structure shown in Fig. 3.

Beyond the feed roll stand 12, the tube blank 16 passes between cluster rolls, the first of which are in a roll stand including confining or gathering rolls 24, 25 (Fig. 2) which hold the tube blank with its edge faces in a definite spaced relation or bring the edges closer together depending upon the adjustment of the gathering rolls.

The roll 24 turns on a substantially vertical axle 26 carried by a frame 28. This frame has a gib base 29 (Fig. 1) which slides in ways on the main frame 30. The roll 25 is supported in a similar manner from a gib base 31 which slides in the same transverse ways, and the gibs are adjusted toward and from one another by a lead screw 33 having a right-hand thread in the gib base 29 and a left-hand thread in the gib base 31. One end of the lead screw 33 has a square section 35 to which a wrench or handle is applied to turn the screw and move the rolls 24 and 25 closer or further from one another to obtain the desired spacing of the tube seam edges.

This construction makes the rolls 24 and 25 adjustable without affecting the parallel relation of their axles and without danger of one roll becoming slightly higher than the other, a condition that makes the tube tend to twist. The lead screw 33 provides an adjusting means of high mechanical advantage, and thus makes possible very accurate adjustment of the positions of the rolls and of the seam edges.

A second set of confining or gathering rolls 37, similar to the rolls 24 and 25, and similarly adjustable, are located just beyond the rolls 24, 25. For very high speed welding machines there may be more than two stands of confining or gathering rolls.

During the time that the tube blank 16 is passing between the gathering rolls, the edge faces are heated locally. Various heating instrumentalities can be employed to raise the temperature of the edge faces. The drawing shows an oxy-fuel gas torch 39 that is particularly suitable for the purpose.

The rolls 24, 25 and 37 hold the edges faces of the tube blank in the desired relation to the torch 39. This is important with direct flame heating, especially when the heating jets are projected at a diagonal to the direction of the adjustment. Rolls were formerly thought unsuitable for the purpose because of the substantial length of the seam edges within the heating zone at one time, and the absolute necessity of accurate adjustment of the edge faces with respect to the diagonal heating jets that are projected directly against the edge faces. Stationary guide surfaces were used prior to this invention but the accurate straight line and equal adjustment of the rolls 24, 25 together with the similar and independent adjustment of the rolls 37 makes practical the combination with direct edge heating apparatus of a plurality of stands of gathering rolls along the length of the heating zone for holding the edge faces in positions where the diagonal heating jets strike at points on the surface that obtain substantially uniform heating over the full widths of the faces.

Immediately beyond the torch 39, the tube blank 16 passes through a welding roll stand 42 having welding rolls 44 and 45 keyed to axles 46 and 47, respectively. These axles turn in bearing blocks 48 and 49 which are vertically movable in guideways on opposite sides of the frame of the welding roll stand. The upper axle 46 is driven from the lower axle 47 through meshing gears 51 and 52 (Fig. 3) secured to the axles.

The bearing blocks 48 and 49 are held in spaced relation by means of adjusting screws 54. These screws are rotated to move the axles 46 and 47 together or apart to change the pressure which the welding rolls exert on the seam edges when pressing them together. The upper welding roll 44 in Fig. 3 has a central groove 56 into which a flash 57 or reinforcement can extend when the welding rolls are adjusted to exert sufficient pressure to squeeze some or all of the molten metal from between the edge portions when they are pressed together to make the weld. A flash may also be squeezed out inside of the tube as shown in Fig. 3.

With the intensity of the heating agencies so correlated with the speed of travel of the tube blank that there is only a superficial melting of the edge faces of the seam, or when making welded tubes where some cast metal in the weld will not be objectionable, the welding rolls are adjusted so that they bring the edge faces of the seam into contact but do not exert any substantial pressure on them. In such a case it is not necessary to have any groove in the face of the upper welding roll.

Fig. 4 shows an upper welding roll 44' which has no groove in its face. Even with smooth welding rolls such as shown in Fig. 4 it is possible to squeeze out an inside flash if it becomes desirable to do so. Except for the lack of a central groove, the rolls shown in Fig. 4 are the same as those of Fig. 3 though shown on a smaller scale.

When the welding rolls are adjusted so as to produce the flash 57, that squeezed-out metal is preferably removed as a continuous operation with the welding. Fig. 1 shows a cutting tool 60 carried by a shoe 61 which is held against the outside of the tube 16' above a supporting roll 62 at sufficient distance beyond the welding rolls so that the metal is cool enough to cut by the time it reaches the tool 60.

Inside flash is removed by a cutting tool 64 carried by a holder 65 at the end of a mandrel 66. The mandrel is held at its forward end by a support 68 fastened to the frame of the machine. The inside cutting tool 64 operates on the tube while it is traveling through a roll stand 70 which is similar in construction to the welding roll stand 42 but has smooth-face rolls such as shown in Fig. 4. When the tube is made with no flash, the cutting tools and mandrel are unnecessary. It is for this reason that no mandrel is shown in Fig. 4.

There are worm wheels 28, 72 and 73 secured to the axles of the lower rolls of the roll stands 12, 42 and 70, respectively. These worm wheels are driven by worms 74, 75 and 76 on a common shaft 77. The shaft is driven from a motor 79 through reduction gearing 80. The speed of the motor can be varied by a speed control device 82. This apparatus for applying power to the rolls is mostly diagrammatic in Fig. 1 and is merely representative of means for driving the rolls at the desired speed.

The use of power to drive the rolls of the roll stand 70 keeps the tube traveling smoothly and the thrust against the cutting tools does not have to be supplied entirely from the welding rolls through the extended length of tubing between the welding rolls and cutting tools. The common drive shaft 77 operating the rolls in both of the roll stands 42 and 70 insures equal speed of the rolls of both stands.

The bottom face of the torch 39 has a longitudinal recess with converging side walls through which jet orifices open, alternate orifices opening through different faces of the recess so as to project alternate flame jets at an angle to, but directly against, the opposite edge faces of the tube blank. The flame jets are directed at angles of approximately 45 degrees to the vertical, as indicated by the diagonal lines in Fig. 2. At the rearward end of the torch ahead of the welding rolls where the edge faces come too close together for direct flame heating, "fish-tail" center flame jets are directed into the closing seam. Such a torch is disclosed in detail in my copending application Serial No. 152,957 (Patent No. 2,249,592).

In the operation of the invention, the tube blank 16, which may be either cold or preheated, is propelled by the feed rolls 14 and 15 into and through the passes between the cluster of gathering or confining rolls 24, 25 and 37, and then into the welding roll stand 42 where the blank is gripped by the power driven welding rolls that assist the feed rolls in advancing the tube through the machine. The gathering rolls 24, 25 and 37 and the supporting roll 62 are preferably idlers, but the rolls in the stand 70 are power driven to help advance the tube 18' against the resistance offered by the cutting tools 60 and 64.

During the passage of the tube blank under the torch 39, the spacing of the edge faces for direct flame heating is controlled by the gathering or confining rolls. The gathering rolls are shaped to provide such clearance between their upper portions that the edge regions of the tube blank 16 extend beyond the concave surfaces of the rolls 24, 25 as shown in Fig. 2. This construction reduces the heating of the rolls, and less heat is lost from the edge portions by having them out of contact with the roll surfaces.

The stationary cutters for removing the flash, and associated features, are claimed in a divisional application, Serial No. 518,711, filed January 18, 1944.

The preferred embodiment of the invention has been described, but other embodiments can be devised, and some features of the invention can be used without others.

I claim:

1. In a tube welding machine with heating means for projecting high-temperature heating jets directly against the separated edge faces of a traveling tube blank along an extended zone of the tube blank to raise the faces to a welding condition, a welding roll stand immediately beyond the heating means, power-driven feed rolls ahead of said heating means, and a plurality of roll stands between the feed rolls and the welding rolls, said stands including confining rolls that contact with the portion of the tube blank that is within said zone along which the heating jets are projected against the edge faces and at points so spaced along the length of said zone as to hold the edge faces of the tube blank under the heating jets in such relation to the heating means that said jets are projected directly against the edge faces.

2. A tube welding machine including in combination power-driven feed rolls for advancing a hot or cold tube blank into the machine and into a zone of heating where high-temperature jets are projected against the edge faces of the blank, a plurality of roll stands beyond the feed rolls and comprising gathering or confining rolls that contact with the tube blank at spaced points intermediate the ends of the zone along which the heating jets are projected against the edge faces, to hold the edge faces of the seam in definite spaced relations throughout the length of said zone of heating, heating means with orifices disposed to project heating jets directly against the separated edge faces of the seam within the zone of heating and both ahead of and behind one or more of the gathering or confining roll stands, and welding rolls close behind the zone of heating for bringing the edges together to make the weld.

3. In tube welding apparatus in which a tube blank is advanced at high speed by power-driven rolls, and the faces of the seam edges are heated to a welding condition by means that project heating jets directly against the separate edge faces of the traveling tube blank for a substantial distance lengthwise of the seam, the improvement which comprises cluster rolls distributed among a plurality of stands and forming passes for the tube blank at a number of points intermediate the ends of that length of the tube blank which is being acted upon by the heating jets, and means for adjusting the cluster rolls of the respective passes to obtain the desired positions of the edge faces of the tube blank as they travel past said heating jets.

4. In a tube welding machine, the combination of a heating device with orifices disposed to project heating jets directly against the separated edge faces of a traveling tube blank in diverging directions transversely of the direction of movement of the tube, confining rolls in contact with the outside surface of that section of the tube blank which is being acted upon by the heating jets, and means for adjusting the rolls in directions extending diagonally of the directions in which said heating jets are projected, said means including a screw that shifts the rolls in opposite directions to obtain accurate correlation of the edge faces and the heating jets.

5. In a tube welding machine, heating means with orifices that direct heating jets in diverging directions, apparatus for advancing a tube blank past said heating means, and a plurality of stands of confining rolls that contact with the outside surface of the tube blank at spaced points intermediate the ends of that section of the tube blank which is being acted upon by the heating means and at some distance back from the seam edges to hold the edge portions with the surfaces of the edge faces spaced from one another and exposed to the direct impingement of the heating jets.

6. In a tube welding machine, heating means with orifices that direct heating jets transversely in diverging directions, apparatus for advancing a tube blank longitudinally past said heating means, and a plurality of stands of confining rolls that contact with the outside surface of the tube blank at spaced points lengthwise of the section of the tube blank that is passing the heating means and at some distance back from the seam edges to hold the edge portions with the surfaces of the edge faces spaced from one another and exposed to the direct impingement of the heating jets, each of said stands of confining rolls including two individual rolls which contact with the tube blank on opposite sides of the seam, a frame holding each of said individual rolls, means on which the frames slide toward and from one another in directions at acute angles to the directions of projection of the heating jets, and a lead screw with right- and left-hand threads for moving the frames simultaneously to obtain an accurate positioning of the seam edges with respect to the heating jets.

7. The combination with tube welding apparatus including a feed roll stand, a welding roll stand, and power means for driving the rolls in both of said stands to advance a tube blank, of a seamwise-extending welding torch between the stands for projecting high intensity flames against the edge faces of the tube blank, cluster rolls comprising a plurality of rolls in contact with the run of the tube blank intermediate the ends of the torch, said cluster rolls being constructed and arranged to contact with the tube blank around most of the circumference of said tube blank and to hold the edge portions with the areas of the edge faces spaced from one another and exposed to the direct impingement of the flames.

8. In a tube welding machine in which heating jets are projected directly against separated edge faces of a seam of a rapidly moving tube blank to raise said edge faces progressively to a welding condition by the time they are brought together in a closing pass, cluster rolls for contacting with the section of the tube blank that is being acted upon by the heating jets, said cluster rolls including four or more rolls divided among two or more roll stands and forming successive roll passes for holding and confining the tube blank at spaced points intermediate the ends of that section which is being acted upon by the jets, and means for shifting the positions of the rolls in directions at acute angles to the directions of jet impingement against the edge faces, the shifting means of the successive roll stands being independent of one another.

9. Tube making apparatus to which skelp is supplied after said skelp has been heated to a temperature less than that required for welding, said apparatus including means for advancing the heated skelp, forming rolls, confining or gathering rolls, welding rolls, and heating means located between the forming and welding rolls and extending across the top of one or more confining or gathering roll passes, said heating means having orifices in position to project heating jets directly against the separated edge faces of the tube blank including the portion of the tube blank in the confining or gathering roll pass, and the rolls of said pass being shaped to the desired contour of the tube blank but spaced at their upper ends so that the edge portions of the tube blank project for some distance beyond the upper ends of the confining or gathering rolls.

JAMES L. ANDERSON.